US012684446B2

(12) United States Patent　(10) Patent No.: US 12,684,446 B2
Fan　(45) Date of Patent: Jul. 14, 2026

(54) METHOD FOR SERVICE SWITCHING BETWEEN TERMINAL DEVICES

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 337 days.

(21) Appl. No.: 18/510,395

(22) Filed: Nov. 15, 2023

(65) Prior Publication Data

US 2024/0089821 A1　Mar. 14, 2024

Related U.S. Application Data

(63) Continuation of application No. PCT/CN2021/095257, filed on May 21, 2021.

(51) Int. Cl.
*H04W 36/30* (2009.01)
*H04W 8/20* (2009.01)
*H04W 36/00* (2009.01)

(52) U.S. Cl.
CPC ......... *H04W 36/305* (2018.08); *H04W 8/205* (2013.01); *H04W 36/00* (2013.01)

(58) Field of Classification Search
CPC ... H04W 36/305; H04W 8/205; H04W 36/00; H04W 36/14
See application file for complete search history.

(56) References Cited

U.S. PATENT DOCUMENTS

| | | | | |
|---|---|---|---|---|
| 2013/0165108 A1* | 6/2013 | Xu | ......................... | H04W 24/00 |
| | | | | 455/423 |
| 2015/0341213 A1* | 11/2015 | Feng | ...................... | H04L 67/51 |
| | | | | 709/221 |
| 2017/0265088 A1* | 9/2017 | Tsuda | .................... | H04W 24/02 |
| 2018/0376444 A1* | 12/2018 | Kim | ...................... | H04W 76/30 |

(Continued)

FOREIGN PATENT DOCUMENTS

| | | |
|---|---|---|
| CN | 110192406 A | 8/2019 |
| CN | 110972224 A | 4/2020 |

(Continued)

OTHER PUBLICATIONS

3rd Generation Partnership Project; Technical Specification Group Radio Access Network; NR; Radio Resource Control (RRC) protocol specification (Release 16), 3GPP TS 38.331, V16.4.1, g41; 3GPP, Organizational RRC Protocol; Mar. 30, 2021; 5 and/or 6.

(Continued)

*Primary Examiner* — Ayaz R Sheikh
*Assistant Examiner* — Mang Boi Thawng
(74) *Attorney, Agent, or Firm* — Ladas & Parry, LLP

(57) ABSTRACT

A method for service switching between terminal devices. The method comprises transmitting, by a first terminal device, a service switching request message to a second terminal device, wherein the service switching request message is configured to request the second terminal device to activate at least one session or service specified by the first terminal device, and comprises identifier information of the at least one session or service.

20 Claims, 3 Drawing Sheets

(56)              References Cited

U.S. PATENT DOCUMENTS

| 2019/0007500 | A1 | | 1/2019 | Kim et al. |
| 2019/0281523 | A1 | * | 9/2019 | Lee ................... H04W 36/0007 |
| 2019/0306761 | A1 | | 10/2019 | Jin et al. |
| 2020/0120570 | A1 | | 4/2020 | Youn et al. |
| 2021/0219369 | A1 | * | 7/2021 | Zheng ................... H04W 48/12 |
| 2021/0314834 | A1 | * | 10/2021 | Gu ........................ H04W 28/26 |
| 2023/0224785 | A1 | * | 7/2023 | Kang ..................... H04W 4/16 |
| | | | | 455/442 |

FOREIGN PATENT DOCUMENTS

| CN | 111491345 | A | 8/2020 |
| CN | 111757403 | A | 10/2020 |
| WO | 2020164018 | A1 | 8/2020 |
| WO | 2022241773 | A1 | 11/2022 |

OTHER PUBLICATIONS

International Search Report, International Application No. PCT/CN2021/095257, mailed Jan. 19, 2022.
Written Opinion of the International Searching Authority in International Application No. PCT/CN2021/095257, mailed Jan. 19, 2022, with machine English translation provided by WIPO and by applicant's foreign counsel.

\* cited by examiner

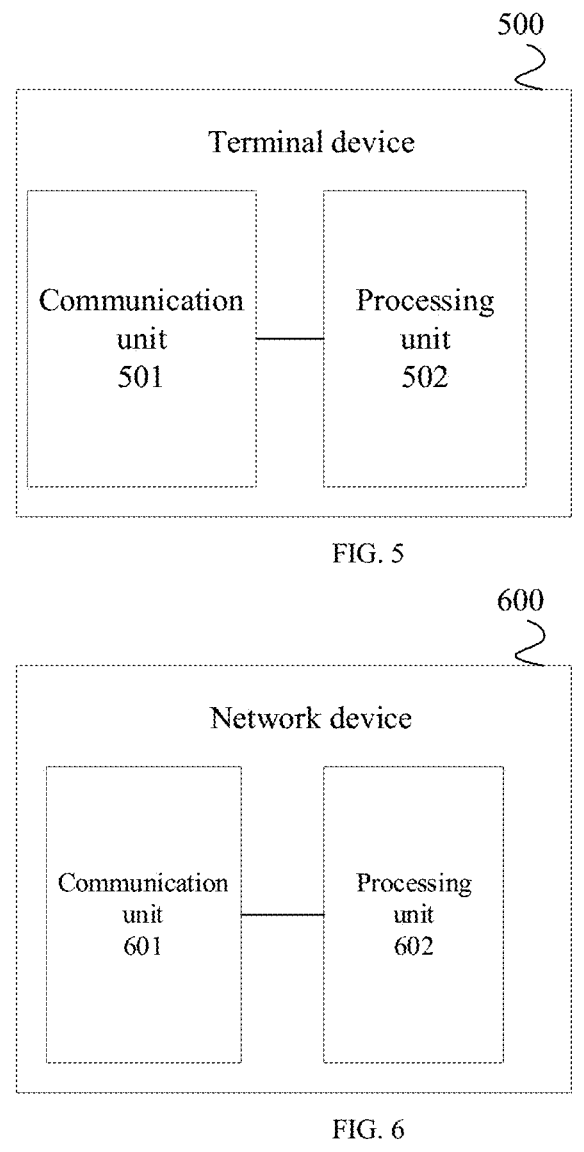

500

Terminal device

| Communication unit 501 | Processing unit 502 |

Network device

| Communication unit 601 | Processing unit 602 |

FIG. 6

METHOD FOR SERVICE SWITCHING BETWEEN TERMINAL DEVICES

CROSS REFERENCE TO RELATED APPLICATIONS

The present disclosure is a continuation of International (PCT) Patent Application No. PCT/CN2021/095257 filed on May 21, 2021, the entire contents of which are hereby incorporated by reference in its entirety.

TECHNICAL FIELD

The present disclosure relates to a technical field of communications, and in particular to a method of service switching between terminal devices.

BACKGROUND

Reliability is an important indicator to evaluate a level of a communication system. In existing communication systems, the reliability is primarily guaranteed in a manner of maintaining data interaction links between network devices and terminal devices as much as possible. However, this mechanism is unable to guarantee the reliability after communication links between the network devices and the terminal devices are interrupted. For some special application scenarios, e.g., a manufacture and control for factory devices, a power supply control of power grid, etc., the reliability after the communication links are interrupted is also particularly important. Thus, the reliability after the communication links are interrupted cannot be guaranteed by relying on the communication link between one terminal device and a network device alone.

SUMMARY OF THE DISCLOSURE

The embodiments of the present disclosure provide a method of service switching between terminal devices According a first aspect of the embodiments of the present disclosure, a method of service switching between terminal devices is disclosed and comprises transmitting, by a first terminal device, a service switching request message to a second terminal device, wherein the service switching request message is configured to request the second terminal device to activate at least one session or service specified by the first terminal device, and comprises identifier information of the at least one session or service.

According a second aspect of the embodiments of the present disclosure, a method of service switching between terminal devices is disclosed and comprises receiving, by a second terminal device, a service switching request message from a first terminal device, wherein the service switching request message is configured to request by the first terminal device, the second terminal device to activate at least one session or service specified by the first terminal device, and the service switching request message comprises identifier information of the at least one session or service; and transmitting, by the second terminal device, a service request message to a network device, and the service request message comprising identifier information of an accepted session or an accepted service in the service switching request message.

According a third aspect of the embodiments of the present disclosure, a method of service switching between terminal devices is disclosed and comprises receiving, by a network device, a service request message from a second terminal device, wherein the service request message comprises identifier information of an accepted session or an accepted service in a service switching request message, the service switching request message is transmitted by a first terminal device to the second terminal device and configured to request by the first terminal device, the second terminal device to activate at least one session or service specified by the first terminal device, and the service switching request message comprises identifier information of the at least one session or service.

BRIEF DESCRIPTION OF THE DRAWINGS

FIG. 5 is a schematic view of a terminal device according to some embodiments of the present disclosure.

FIG. 6 is a schematic view of a network device according to some embodiments of the present disclosure.

DETAILED DESCRIPTION

Embodiments of the present disclosure are described in combination with accompanying drawings in the embodiments of the present disclosure.

Figure 1:
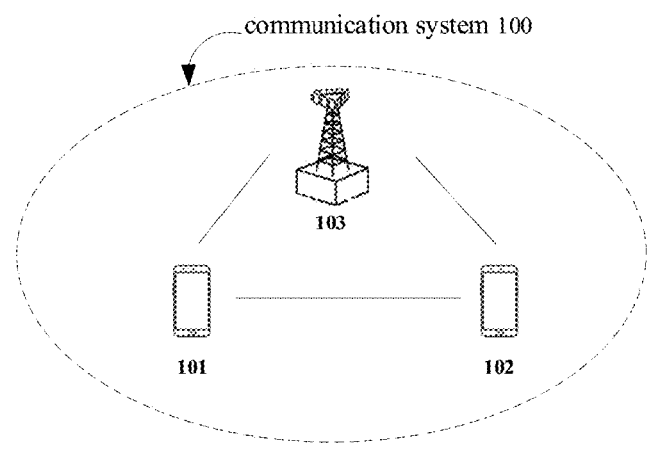
FIG. 1 is a structural schematic view of a communication system 100 according to some embodiments of the present disclosure.

As shown in FIG. 1, FIG. 1 is a structural schematic view of a communication system 100 according to some embodiments of the present disclosure. The communication system 100 includes a first terminal device 101, a second terminal device 102, and a network device 103. The network device 103 and the first terminal device 101, as well as the network device 103 and the second terminal device 10 may communicate with each other through other devices or network units. The method in this embodiment is applicable to the communication system 100 shown in FIG. 1.

In some embodiments, the network device 103 may be a base station, an evolved NodeB (eNodeB), a transmission reception point (TRP), a next generation NodeB (gNB) in a 5G mobile communication system, a base station in a future mobile communication system or an access node in a WiFi system, etc. The network device 103 may also be a module or a unit configured to complete a part of functions of the base station, e.g., a central unit (CU), a distributed unit (DU). A specific technique or a specific device form adopted by the network device is not limited in the embodiments of the present disclosure. The network device 103 may also include a core network device. The core network device includes, e.g., an access and mobility management function (AMF), a user plane function (UPF) or a session management function (SMF), etc.

The first terminal device 101 and the second terminal device 102 may also be referred to as terminals, user equipment (UE), mobile stations, mobile terminals, and the like. For example, the first terminal device 101 and the second terminal device 102 may be cellular phones, tablet computers, computers with wireless transceiving functions, virtual reality terminal devices, augmented reality terminal devices, wireless terminals in industrial control, vehicle-mounted wireless terminals, wireless terminals in remote surgeries, wireless terminals in smart grids, wireless terminals in transportation security, wireless terminals in smart cities, wireless terminals in smart homes, and the like. The vehicle-mounted wireless terminals refer to terminal devices placed or installed in a vehicle, which may also be referred to as on-board units (OBU). The first terminal device 101 and the second terminal device 102 may also be wearable devices. The wearable devices may also be referred to as wearable smart devices or smart wearable devices, which is a general term of wearable devices obtained by intelligently designing and developing daily wears, such as glasses, gloves, watches, clothing, and shoes, by means of wearable techniques. The first terminal device 101 and the second terminal device 102 may also be other devices capable of communicating with the network devices, such as relay devices. The specific techniques and specific device forms of both the first terminal device 101 and the second terminal device 102 are not limited in the embodiments of the present disclosure.

First of all, a part of the terms used in the present disclosure are explained and illustrated to facilitate those skilled in the art to understand.

(1) The International Telecommunication Union (ITU) has defined three categories of application scenarios for 5G and future mobile communication systems: enhanced mobile broadbands (eMBB), ultra reliable and low latency communications (URLLC) and massive machine type communications (mMTC).

The eMBB still takes the UE acquiring multimedia content, services, and data as a target, a demand thereof is growing rapidly. On the other hand, since the eMBB may be deployed in different scenarios, such as indoors, city, countryside, etc., capabilities and demands thereof vary greatly in these different scenarios, which cannot be generalized and have to be analyzed in detail in relation to specific deployment scenarios. Typical applications of the URLLC include industrial automation, electric power automation, telemedicine operations (surgeries), and traffic safety and security, etc. Typical characteristics of the mMTC include a high connection density, a small data volume, a latency-insensitive service, a low cost and long service life of a module, etc.

(2) Radio resource control (RRC) states, the terminal device has three RRC states: a RRC connection state (RRC_ CONNECTED), a RRC idle state (RRC_IDLE), and an inactive state (RRC_INACTIVE).

The RRC_IDLE (or may also be referred to as an idle state. In the embodiments of the present disclosure, two terms, i.e., "idle state" and "RRC idle stat", are the same concept, which are exchangeable): no RRC connection is established between the terminal device and a network, and the base station does not store a context of the terminal device. When the terminal device needs to enter the RRC connection state from the RRC idle state, the terminal device is required to initiate a RRC connection establishment process. Mobility is cell selection reselection based on the terminal device. Paging is initiated by a core network (CN) and a paging area is configured by the CN.

RRC_CONNECTED (or may also be referred to as a connection state. In the embodiments of the present disclosure, two terms, "connection state" and "RRC connection state", are the same concept, which are exchangeable): the RRC connection is established between the terminal device and the network for data transmission. The base station stores the context of the terminal device. The base station knowing a location of the terminal device is in a cell-specific level. The mobility is mobility controlled by the base station. Unicast data may be transmitted between the base station and the terminal device.

RRC inactive state (or may also be simply referred to as the inactive state. In the embodiments of the present disclosure, terms "de-activated state", "inactive state", "RRC inactive state", and "RRC de-activated state" are the same concept, which are exchangeable): the terminal previously entered the RRC connection state, and the base station then released the RRC connection, while the base station stores the context of the terminal device. The mobility is the cell selection reselection based on the terminal device. A connection exists between the CN and a radio access network (RAN). The paging is triggered by the RAN, and the paging area based on the RAN is managed by the RAN. The base station knowing the location of the terminal device is in a level based on a paging area of the RAN.

A manner of maintaining a data interaction link between the network device and the terminal device as much as possible fails to ensure the reliability after the communication link is interrupted. For some special application scenarios, e.g., a manufacture and control for factory devices, a power supply control of power grid, etc., the reliability after the communication link is interrupted is also particularly important. The reliability after the communication link is interrupted cannot be guaranteed by relying on the communication link between one terminal device and the network device alone. Thus, in order to solve the above problem, the embodiments of the present disclosure provide the following solution.

Figure 2:
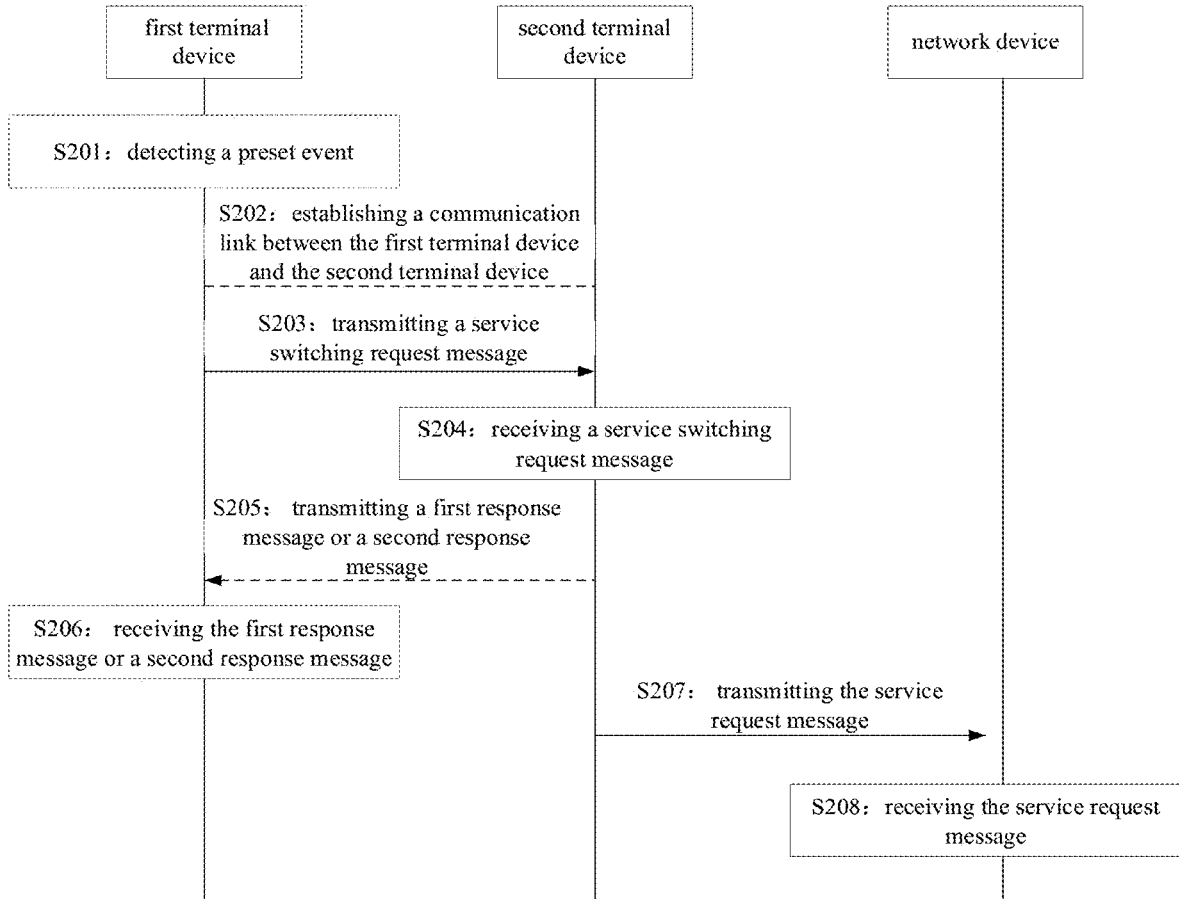
FIG. 2 is a schematic view of a method of service switching between terminal devices according to some embodiments of the present disclosure.

As shown in FIG. 2, FIG. 2 is a schematic view of a method of service switching between terminal devices according to some embodiments of the present disclosure. The method includes, but not limited to, operations S201-S208.

In an operation S201, the first terminal device detects a preset event.

In an embodiment, this operation is alternative.

In an embodiment, the preset event includes at least one of events 1-14. An event 1: the first terminal device receives a first request message from an upper layer, the upper layer is a Non-access stratum (NAS) or an application layer, and the first request message is configured to instruct the first terminal device to perform a service switching process. An event 2: the first terminal device occurs a wireless link failure. An event 3: the first terminal device occurs the wireless link failure and a rebuilding failure. An event 4: times of the first terminal device occurring the wireless link failure within a time window T1 exceed a first threshold. An event 5: an interval between two consecutive times of the first terminal device occurring the wireless link failure is less than or equal to a second threshold. An event 6: a service-cell measurement result of the first terminal device is less than or equal to a third threshold value. An event 7: the service-cell measurement result of the first terminal device is less than or equal to a fourth threshold value and lasts for a first duration. An event 8: the first terminal device is in a state of camping on any cell or in a state of any cell selection. An event 9: a quality of service (QoS) measurement result of the first terminal device fails to satisfy a QoS requirement. An event 10: the QoS measurement result of the first terminal device fails to satisfy the QoS requirement and lasts for a second duration. An event 11: a timer T2 of the first terminal device expires. An event 12: the first terminal device searches for at least one terminal device available to perform the service switching process. An event 13: the first terminal device receives a second request message from a network device, and the second request message is configured to instruct the first terminal device to perform the service switching process. An event 14: the first terminal device receives a third request message from a second terminal device, and the third request message is configured to instruct the first terminal device to perform the service switching process.

The preset event may include any one of the events 1-14. Of course, the preset event may also include any plurality of events 1-14. When the preset event includes any plurality of events 1-14, the preset event is determined to be triggered only when at least two included single events are triggered. In an example, any one of events 1-11 may be combined with the event 12 or the event 13 or the event 14 for usage. When the preset event includes the event 1 and the event 12, the preset event is the first terminal device receiving the first request message from the upper layer, and the first terminal device searches for at least one terminal device available to perform the service switching process. In an example, the events 1-5 may be used in combination with the events 6-7. When the preset event includes the event 1 and the event 6, the preset event is the first terminal device receiving the first request message from the upper layer, and the service-cell measurement result of the first terminal device being less than or equal to the third threshold value. In another example, the events 9-11 may be used in combination with the events 6-7. When the preset event includes the event 9 and the event 6, the preset event is the QoS measurement result of the first terminal device failing to satisfy the QoS requirement, and the service-cell measurement result of the first terminal device being less than or equal to the third threshold value.

In some embodiments, at least one of the T1, the T2, the first threshold, the second threshold, the third threshold, the fourth threshold, the first duration, and the second duration may be determined in the following two manners. In a first manner, the first terminal device receives a first system broadcast message or a first specific signaling from the network device. The first system broadcast message or the first specific signaling is configured to configure at least one of: the T1, the T2, the first threshold, the second threshold, the third threshold, the fourth threshold, the first duration, and the second duration. In a second manner, at least one of the T1, the T2, the first threshold, the second threshold, the third threshold, the fourth threshold, the first duration, and the second duration is a default value.

In some embodiments, the service-cell measurement result includes a cell-level measurement result or a beam-level measurement result. The cell-level measurement result includes at least one of: a reference signal received power (RSRP), a reference signal receiving quality (RSRQ), and a signal-noise ratio (SINR).

In an embodiment, when the preset event includes the event 13, i.e., the first terminal device receiving the second request message from the network device, and the second request message being configured to instruct the first terminal device to perform the service switching process, the method further includes the first terminal device receiving assistance information from the network device, and the assistance information being configured to assist the first terminal device to search for the second terminal device.

In an embodiment, when the preset event includes the event 11, i.e., the timer T2 of the first terminal device expiring, the method further includes the first terminal device turning on the timer T2 according to a turn-on condition, and the turn-on condition includes that the QoS measurement result of the first terminal device fails to satisfy the QoS requirement; and the first terminal device stopping the timer T2 according to a stopping condition, and the stopping condition includes that the QoS measurement result of the first terminal device satisfies the QoS requirement during operating of the timer T2. In some embodiments, the QoS requirement includes at least one of a data-transmission symbol error rate requirement, a data-transmission delay requirement, and a data-transmission rate requirement.

In an operation S202, the first terminal device establishes a communication link between the first terminal device and the second terminal device.

In some embodiments, this operation is alternative. The first terminal device may be a source terminal device. Accordingly, the second terminal device may be a target terminal device.

In some embodiments, the first terminal device establishing the communication link between the first terminal device and the second terminal device may include a synchronization process, a channel establishment process, a capability interaction process, a configuration interaction process, and a security establishment process, etc.

In an embodiment, before the first terminal device establishes the communication link between the first terminal device and the second terminal device, the method further includes the first terminal device receiving search configuration information from the network device, and the search configuration information being configured to assist the first terminal device to search for the second terminal device. The search configuration information includes at least one of synchronization signal information of the second terminal device, position information of the second terminal device, and identifier information of the second terminal device.

In an embodiment, the first terminal device receives a second system broadcast message or a second specific signaling from the network device, and the second system broadcast message or second specific signaling is configured to configure the search configuration information.

In an embodiment, the operation S202 and the operation S201 has no fixed time sequence.

In an operation S203, the first terminal device transmitting a service switching request message to the second terminal device.

The service switching request message is configured to request the second terminal device to activate at least one session or service specified by the first terminal device, and includes identifier information of the at least one session or service. In an example, in a case of the service switching request message including identifier information of two services (respectively a service 1 and a service 2), the service switching request message is configured to request the second terminal device to activate the service 1 and the service 2 specified by the first terminal device.

In some embodiments, the service switching request message further includes a serving-temporary mobile subscriber identifier (S-TMSI) and/or a cell radio network temporary identifier (C-RNTI) of the first terminal device.

In some embodiments, the service switching request message may be a NAS massage or an access stratum massage. The access stratum message may also be a radio resource control (RRC) message, a stratum 2 message, or a stratum 1 message. The stratum 2 message refers to a message transmitted by any one of a service data adaptation protocol (SDAP) stratum, a packet data convergence protocol (PDCP) stratum, a radio link control (RLC) stratum, a media access control (MAC) stratum. The stratum 1 message refers to a message carried by a physical downlink control channel (PDCCH), a message carried by a physical downlink shared channel (PDSCH).

In an embodiment, the method further includes triggering the first terminal device to transmit the service switching request message to the second terminal in response to detecting a preset event. A description related to the preset event is described in the operation S201, which is not repeated herein.

In some embodiments, before the first terminal device transmits the service switching request message, the method includes the first terminal device receiving instruction information from the network device, and the instruction information being configured to instruct that the service switching request message is determined to be transmitted to the second terminal device. Of course, the instruction information may also be configured to instruct that the service switching request message is determined to be not transmitted to the second terminal device. When the instruction information is configured to instruct that the service switching request message is determined to be not transmitted to the second terminal device, the operation S203 is not performed. In some embodiments, the instruction information is carried in at least one message of: a specific signaling, a system broadcast message, a NAS message, downlink control information (DCI), a medium access control element (MAC CE), a paging short message, and a paging message.

In some embodiments, before the first terminal device transmits the service switching request message to the second terminal device, the method further includes the first terminal device determining to transmit the service switching request message to the second terminal device based on capability information of the first terminal device. The capability information is configured to instruct that the service switching request message is determined to be transmitted to the second terminal device. Of course, the capability information may also be configured to instruct that the service switching request message is determined to be not transmitted to the second terminal device. When the capability information is configured to instruct that the service switching request message is determined to be not transmitted to the second terminal device, the operation S203 is not performed. The capability information may be preconfigured before the first terminal device is shipped from a factory, i.e., pre-configured process configuration.

In an operation S204, the second terminal device receives the service switching request message from the first terminal device.

In an operation S205, the second terminal device transmits a first response message or a second response message to the first terminal device.

In an embodiment, this operation is alternative.

In some embodiments, the first response message is configured to indicate that the session or service identified by all the identifier information in the service switching request message is fully accepted, or the first response message is configured to indicate that the session or service identified by all the identifier information in the service switching request message is fully rejected. Being fully accepted or being fully rejected may be represent in the following three manners. In a first manner, being fully accepted or being fully rejected may be indicated through one information including different parameters. For an example, the first response message includes two indication fields, i.e., an indication field 1 and an indication field 2. The indication field 1 is configured to indicate that the session or service identified by all the identifier information in the service switching request message is fully accepted. The indication field 2 is configured to indicate that the session or service identified by all the identifier information in the service switching request message is fully rejected. In a second manner, being fully accepted or being fully rejected may be distinguished through one information including the same parameters while the same parameters having different valuing ranges. For an example, the first response message includes one indication field. When the indication field is 1, it is indicated that the session or service identified by all the identifier information in the service switching request message is fully accepted. When the indication field is 0, it is indicated that the session or service identified by all the identifier information in the service switching request message is fully rejected. In a third manner, being fully accepted or being fully rejected may be distinguished through two independent messages.

In some embodiments, the second response message is configured to indicate that identifier information of at least one session or service which is accepted in the service switching request message, and/or the second response message is configured to indicate identifier information of at least one session or service which is rejected in the service switching request message. That is, when the service switching request message includes the identifier information of the two services (respectively the service 1 and the service 2) and the identifier information of a service received by the second terminal device is the service 1, the second response message is configured to indicate the identifier information of a received service in the service switching request message is the service 1, and/or the second response information is configured to indicate the identifier information of a rejected service in the service switching request message is the service 2.

In some embodiments, the second response message further includes rejected reason information and/or rejected time limit information of the at least one session or service which is rejected. For example, the rejected reason information may be that a rejected session or a rejected service conflicts with a session or service of the second terminal device itself, and may also be that the rejected session or the rejected service is rejected by the network device, etc. For another example, the rejected time limit information may be a definition of a duration of the rejected session or service being rejected, i.e., how long it takes before the first terminal device is allowed to initiate the service switching request message of the rejected session or the rejected service again.

In some embodiments, the first response message or the second response message may be the NAS message or the access stratum message. The access stratum message may also be the RRC message, the stratum 2 message, the stratum 1 message, which may refer to the description in the operation S203 and be not limited herein.

In an operation S206, the first terminal device receives the first response message or the second response message from the second terminal device.

In some embodiments, this operation is alternative.

In an operation S207, the second terminal device transmits the service request message to the network device.

In some embodiments, the network device may be an access network device or a core network device. The service request message includes identifier information of an accepted session or an accepted service in the service switching request message. The identifier information of the accepted session or the accepted service corresponds to the first response message or the second response message. That is, the identifier information of the accepted session or the accepted service may refer to the identifier information of a fully-accepted session or service identified by all identifier information in the service switching request message indicated in the first response message, or may also refer to the identifier information of the at least one session or service which is accepted in the service switching request message indicated in the second response message.

For example, when the service switching request message includes two service identifier information (respectively the service 1 and the service 2) and the identifier information of the service received by the second terminal device is the service 1, the identifier information of the service included in the service request message transmitted by the second terminal device to the network device is the service 1. For another example, when the service switching request message includes two service identifier information (respectively the service 3 and the service 4) and the identifier information of services received by the second terminal device is the service 3 and the service 4, the identifier information of the services included in the service request message transmitted by the second terminal device to the network device is the service 3 and the service 4.

In some embodiments, the service switching request message further includes a S-TMSI and/or a C-RNTI of the first terminal device.

In an operation S208, the network device receives the service request message from the second terminal device.

In some embodiments, the service request message includes the identifier information of the accepted session or service in the service switching request message.

Operations S205 and S206 have no time sequence with operations S207 and S208.

When the operations S205 and S206 are performed before the operations S207 and S208, the identifier information of the accepted session or service in the service switching request message in the operation S207 corresponds to the identifier information of the fully-accepted session or service indicated by the first response message or the identifier information of the at least one session or service which is accepted in the service switching request message indicated by the second response message. In this case, the second response message further includes the rejected reason information of the at least one session or service which is rejected. The rejected reason information may be that the at least one session or service which is rejected conflicts with the session or service of the second terminal device itself.

When the operations S205 and S206 are performed after the operations S207 and S208, the identifier information of the fully-accepted session or service indicated by the first response message or the identifier information of the at least one session or service which is accepted in the service switching request message indicated by the second response message in the operation S205 corresponds to the identifier information of the session or service accepted by the network device in the operation S208. In this case, the second response message further includes the rejected reason information of the at least one session or service which is rejected. The rejected reason information may be that the at least one session or service which is rejected conflicts with the session or service of the second terminal device itself, or the at least one session or service which is rejected is rejected by the network device.

In the method as shown in FIG. 2, the first terminal device transmits the service switching request message to the second terminal device, and accordingly, the second terminal device receives the service switching request message from the first terminal device, and the second terminal device then transmits the service request message to the network device. In this way, a problem of failing to guaranteeing the reliability after the communication link is interrupted by relying on the communication link between one terminal device and the network device alone may be resolved, such that of the continuity of the session or service may be achieved and the communication reliability of the session or service may be improved.

The method of the embodiments of present disclosure is illustrated in detail in the above, and devices of the embodiments of present disclosure are provided in the following.

Figure 3:
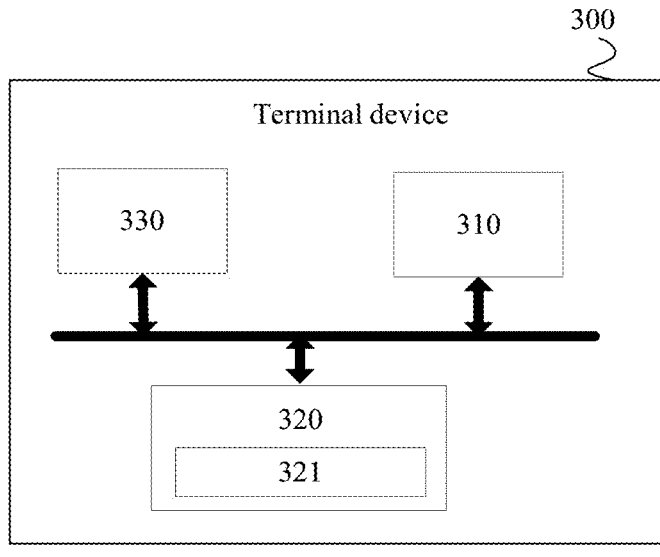
FIG. 3 is a structural schematic view of a terminal device according to some embodiments of the present disclosure.

As shown in FIG. 3, FIG. 3 is a structural schematic view of a terminal device according to some embodiments of the present disclosure. The terminal device may include a processor 310 or a memory 320. In some embodiments, the terminal device further includes a transceiver 330. The memory 320 is configured to store a computer program or instructions 321, the transceiver 330 is configured to receive and transmit data, and the processor 310 is configured to call the computer program or instructions to implement an operation of transmitting a service switching request message to a second terminal device through the transceiver 330. The service switching request message is configured to request the second terminal device to activate at least one session or service specified by the terminal device, and the service switching request message includes identifier information of the at least one session or service.

In an embodiment, the service switching request message further includes a S-TMSI and/or a C-RNTI of the terminal device.

In an embodiment, the processor 310 is further configured to trigger transmitting the service switching request message to the second terminal in response to detecting a preset event.

In an embodiment, the preset event includes at least one of the transceiver 330 receiving a first request message from an upper layer, the upper layer being a NAS or an application layer, and the first request message being configured to instruct the terminal device to perform a service switching process; the terminal device occurring a wireless link failure; the terminal device occurring the wireless link failure and a rebuilding failure; times of the terminal device occurring the wireless link failure within a time window T1 exceeding a first threshold; an interval between two consecutive times of the terminal device occurring the wireless link failure being less than or equal to a second threshold; a service-cell measurement result of the terminal device being less than or equal to a third threshold value; the service-cell measurement result of the terminal device being less than or equal to a fourth threshold value and lasting for a first duration; the terminal device in a state of camping on any cell or in a state of any cell selection; a QoS measurement result of the terminal device failing to satisfy a QoS requirement; the QoS measurement result of the terminal device failing to satisfy the QoS requirement and lasting for a second duration; a timer T2 of the terminal device expiring; the terminal device searching for at least one terminal device available to perform the service switching process; the transceiver 330 receiving a second request message from a network device, and the second request message being configured to instruct the first terminal device to perform the service switching process; and the transceiver 330 receiving a third request message from a second terminal device, and the third request message being configured to instruct the first terminal device to perform the service switching process.

In an embodiment, the transceiver 330 is further configured to receive assistance information from the network device, and the assistance information is configured to assist the terminal device to search for the second terminal device.

In an embodiment, the transceiver 330 is further configured to receive a first system broadcast message or a first specific signaling from the network device, and the first system broadcast message or the first specific signaling is configured to configure at least one of: the T1, the T2, the first threshold, the second threshold, the third threshold, the fourth threshold, the first duration, and the second duration.

In an embodiment, at least one of the T1, the T2, the first threshold, the second threshold, the third threshold, the fourth threshold, the first duration, and the second duration is a default value.

In an embodiment, the service-cell measurement result includes a cell-level measurement result or a beam-level measurement result.

In an embodiment, the service-cell measurement result includes at least one of a RSRP, a RSRQ, and a SINR.

In an embodiment, the processer is further configured to turn on the timer T2 according to a turn-on condition, and the turn-on condition includes that the QoS measurement result of the terminal device fails to satisfy the QoS requirement; and stop the timer T2 according to a stopping condition, and the stopping condition including that the QoS measurement result of the terminal device satisfies the QoS requirement during operating of the timer T2.

In an embodiment, the QoS requirement includes at least one of a data-transmission symbol error rate requirement, a data-transmission delay requirement, and a data-transmission rate requirement.

In an embodiment, the processor 310 is further configured to establish a communication link between the processer and the second terminal device before the service switching request message is transmitted to the second terminal device.

In an embodiment, the transceiver 330 is further configured to receive search configuration information from the network device before the communication link between the processer and the second terminal device is established, and the search configuration information is configured to assist the terminal device to search for the second terminal device.

In an embodiment, the search configuration information includes at least one of synchronization signal information of the second terminal device, position information of the second terminal device, and identifier information of the second terminal device.

In an embodiment, the transceiver 330 is further configured to receive a second system broadcast message or a second specific signaling from the network device, and the second system broadcast message or second specific signaling is configured to configure the search configuration information.

In an embodiment, the transceiver 330 is further configured to receive a first response message from the second terminal device after transmitting the service switching request message to the second terminal device, and the first response message is configured to indicate that the session or service identified by all the identifier information in the service switching request message is fully accepted, or the first response message is configured to indicate that the session or service identified by all the identifier information in the service switching request message is fully rejected.

In an embodiment, the transceiver 330 is further configured to receive a second response message from the second terminal device after transmitting the service switching request message to the second terminal device, and the second response message is configured to indicate that identifier information of at least one session or service which is accepted in the service switching request message, and/or the second response message is configured to indicate identifier information of at least one session or service which is rejected in the service switching request message.

In an embodiment, the second response message further includes rejected reason information and/or rejected time limit information of the at least one session or service which is rejected.

In an embodiment, the service switching request message, and a first response message or a second response message are NAS messages, or the service switching request message, and the first response message or the second response message are access stratum messages.

In an embodiment, the transceiver 330 is further configured to receive instruction information from the network device before transmitting the service switching request message to the second terminal device, and the instruction information is configured to instruct that the service switching request message is determined to be transmitted to the second terminal device.

In an embodiment, the instruction information is carried in at least one message of a specific signaling, a system broadcast message, a NAS message, DCI, a MAC CE, a paging short message, and a paging message.

In an embodiment, the processor 310 is further configured to determine to transmit the service switching request message to the second terminal device based on capability information of the terminal device before the service switching request message is transmitted to the second terminal device, and the capability information is configured to instruct that the service switching request message is determined to be transmitted to the second terminal device.

In an embodiment, the network device is an access network device or a core network device.

As shown in FIG. 3, FIG. 3 is a structural schematic view of the terminal device according to some embodiments of the present disclosure. The terminal device may include the processor 310 or the memory 320. In some embodiments, the terminal device further includes the transceiver 330. The memory 320 is configured to store the computer program or instructions 321, the transceiver 330 is configured to receive and transmit the data, and the processor 310 is configured to call the computer program or instructions to implement the following operations.

The transceiver 330 is configured to receive a service switching request message through from a first terminal device. The service switching request message is configured to request by the first terminal device, the terminal device to activate at least one session or service specified by the first terminal device, and the service switching request message includes identifier information of the at least one session or service.

The transceiver 330 is configured to transmit a service request message to a network device, and the service request message includes identifier information of an accepted session or an accepted service in the service switching request message.

In an embodiment, the service switching request message further includes a S-TMSI and/or a C-RNTI of the first terminal device.

In an embodiment, the service request message includes a S-TMSI and/or a C-RNTI of the first terminal device.

In an embodiment, the transceiver 330 is further configured to transmit a third request message to the first terminal device before receiving the service switching request message from the first terminal device, and the third request message is configured to instruct the first terminal device to perform a service switching process.

In an embodiment, the transceiver 330 is further configured to transmit a first response message to the first terminal device after receiving the service switching request message from the first terminal device, and the first response message is configured to indicate that the session or service identified by all the identifier information in the service switching request message is fully accepted, or the first response message is configured to indicate that the session or service identified by all the identifier information in the service switching request message is fully rejected.

In an embodiment, the transceiver 330 is further configured to transmit a second response message to the first terminal device after receiving the service switching request message from the first terminal device, and the second response message is configured to indicate that identifier information of at least one session or service which is accepted in the service switching request message, and/or the second response message is configured to indicate identifier information of at least one session or service which is rejected in the service switching request message.

In an embodiment, the second response message further includes rejected reason information and/or rejected time limit information of the at least one session or service which is rejected.

In an embodiment, the service switching request message, and a first response message or a second response message are NAS messages, or the service switching request message, and the first response message or the second response message are access stratum messages.

Figure 4:
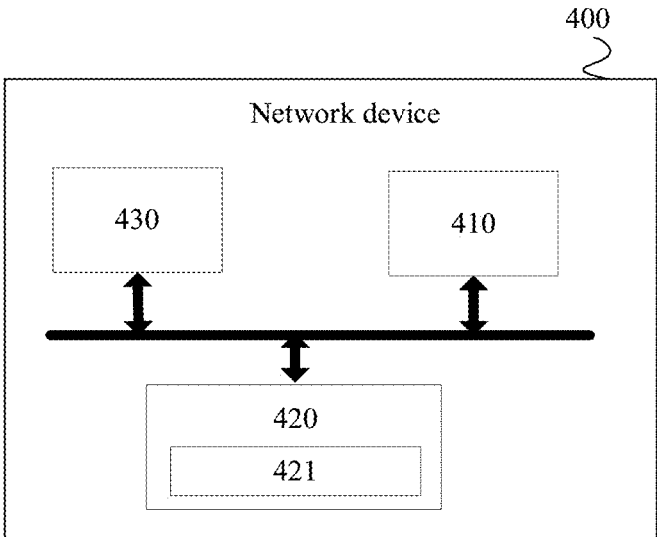
FIG. 4 is a structural schematic view of a network device according to some embodiments of the present disclosure.

As shown in FIG. 4, FIG. 4 is a structural schematic view of a network device according to some embodiments of the present disclosure. The network device may include a processor 410 or a memory 420. In some embodiments, the network device further includes a transceiver 430. The memory 420 is configured to store a computer program or instructions 421, the transceiver 430 is configured to receive and transmit data, and the processor 410 is configured to call the computer program or instructions to implement an operation of receiving a service request message through the transceiver 430 from a second terminal device. The service request message includes identifier information of an accepted session or an accepted service in a service switching request message, the service switching request message is transmitted by a first terminal device to the second terminal device and configured to request by the first terminal device, the second terminal device to activate at least one session or service specified by the first terminal device, and the service switching request message includes identifier information of the at least one session or service.

In an embodiment, the service request message further includes a S-TMSI and/or a C-RNTI of the first terminal device.

In an embodiment, the transceiver 330 is further configured to transmit search configuration information to the first terminal device before receiving the service request message from the second terminal device, and the search configuration information is configured to assist the first terminal device to search for the second terminal device.

In an embodiment, the search configuration information includes at least one of synchronization signal information of the second terminal device, position information of the second terminal device, and identifier information of the second terminal device.

In an embodiment, the transceiver 330 is configured to transmit a second system broadcast message or a second specific signaling to the first terminal device, and the second system broadcast message or the second specific signaling is configured to configure the search configuration information.

In an embodiment, the transceiver 330 is configured to transmit a second request message to the first terminal device before receiving the service request message from the second terminal device, and the second request message is configured to instruct the first terminal device to perform a service switching process.

In an embodiment, the transceiver 330 is configured to transmit instruction information to the first terminal device before receiving the service request message from the second terminal device, and the instruction information is configured to instruct that the service switching request message is determined to be transmitted to the second terminal device.

In an embodiment, the instruction information is carried in at least one message of a specific signaling, a system broadcast message, a NAS message, DCI, a MAC CE, a paging short message, and a paging message.

In an embodiment, the network device is an access network device or a core network device.

As shown in FIG. 5, FIG. 5 is another schematic view of the terminal device involved in above embodiments. The terminal device may include a communication unit 501 and a processing unit 502. These units may perform corresponding functions of the first terminal device in method examples described above. The processing unit 502 is configured to control and manage actions of the first terminal device. For example, the processing unit 502 is configured to support the first terminal device to perform the operation 201 in FIG. 2, and/or other processes configured for the techniques described herein. The communication unit 501 may be configured to support communication between the first terminal device and other devices, e.g., the communication with the second terminal device or the network device.

The processing unit 502 may be a processor or controller. For example, the processing unit 502 may be a Central Processing Unit (CPU), a general-purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. The processing unit 502 may implement or execute various exemplary logic blocks, modules, and circuits described in conjunction with the contents of the present disclosure. The processor may also be a combination implementing computing functions, such as a combination including one or more microprocessors, a combination of the DSP and a microprocessor, or the like. The communication unit 501 may be a transceiver, a transceiving circuit, a RF chip, etc.

The communication unit 501 is configured to transmit a service switching request message to a second terminal device. The service switching request message is configured to request the second terminal device to activate at least one session or service specified by the terminal device, and the service switching request message includes identifier information of the at least one session or service.

In an embodiment, the service switching request message further includes a S-TMSI and/or a C-RNTI of the terminal device.

In an embodiment, the processing unit 502 is further configured to trigger transmitting the service switching request message to the second terminal in response to detecting a preset event.

In an embodiment, the preset event includes at least one of the communication unit 501 receiving a first request message from an upper layer, the upper layer being a NAS or an application layer, and the first request message being configured to instruct the terminal device to perform a service switching process; the terminal device occurring a wireless link failure; the terminal device occurring the wireless link failure and a rebuilding failure; times of the terminal device occurring the wireless link failure within a time window T1 exceeding a first threshold; an interval between two consecutive times of the terminal device occurring the wireless link failure being less than or equal to a second threshold; a service-cell measurement result of the terminal device being less than or equal to a third threshold value; the service-cell measurement result of the terminal device being less than or equal to a fourth threshold value and lasting for a first duration; the terminal device in a state of camping on any cell or in a state of any cell selection; a QoS measurement result of the terminal device failing to satisfy a QoS requirement; the QoS measurement result of the terminal device failing to satisfy the QoS requirement and lasting for a second duration; a timer T2 of the terminal device expiring; the terminal device searching for at least one terminal device available to perform the service switching process; the communication unit 501 receiving a second request message from a network device, and the second request message being configured to instruct the first terminal device to perform the service switching process; and the communication unit 501 receiving a third request message from a second terminal device, and the third request message being configured to instruct the first terminal device to perform the service switching process.

In an embodiment, the communication unit 501 is further configured to receive assistance information from the network device, and the assistance information is configured to assist the terminal device to search for the second terminal device.

In an embodiment, the communication unit 501 is further configured to receive a first system broadcast message or a first specific signaling from the network device, and the first system broadcast message or the first specific signaling is configured to configure at least one of: the T1, the T2, the first threshold, the second threshold, the third threshold, the fourth threshold, the first duration, and the second duration.

In an embodiment, at least one of the T1, the T2, the first threshold, the second threshold, the third threshold, the fourth threshold, the first duration, and the second duration is a default value.

In an embodiment, the service-cell measurement result includes a cell-level measurement result or a beam-level measurement result.

In an embodiment, the service-cell measurement result includes at least one of a RSRP, a RSRQ, and a SINR.

In an embodiment, the processer is further configured to turn on the timer T2 according to a turn-on condition, and the turn-on condition includes that the QoS measurement result of the terminal device fails to satisfy the QoS requirement; and stop the timer T2 according to a stopping condition, and the stopping condition including that the QoS measurement result of the terminal device satisfies the QoS requirement during operating of the timer T2.

In an embodiment, the QoS requirement includes at least one of a data-transmission symbol error rate requirement, a data-transmission delay requirement, and a data-transmission rate requirement.

In an embodiment, the processing unit 502 is further configured to establish a communication link between the processer and the second terminal device before the service switching request message is transmitted to the second terminal device.

In an embodiment, the communication unit 501 is further configured to receive search configuration information from the network device before the communication link between the processer and the second terminal device is established, and the search configuration information is configured to assist the terminal device to search for the second terminal device.

In an embodiment, the search configuration information includes at least one of synchronization signal information of the second terminal device, position information of the second terminal device, and identifier information of the second terminal device.

In an embodiment, the communication unit 501 is further configured to receive a second system broadcast message or a second specific signaling from the network device, and the second system broadcast message or second specific signaling is configured to configure the search configuration information.

In an embodiment, the communication unit 501 is further configured to receive a first response message from the second terminal device after transmitting the service switching request message to the second terminal device, and the first response message is configured to indicate that the session or service identified by all the identifier information in the service switching request message is fully accepted, or the first response message is configured to indicate that the session or service identified by all the identifier information in the service switching request message is fully rejected.

In an embodiment, the communication unit 501 is further configured to receive a second response message from the second terminal device after transmitting the service switching request message to the second terminal device, and the second response message is configured to indicate that identifier information of at least one session or service which is accepted in the service switching request message, and/or the second response message is configured to indicate identifier information of at least one session or service which is rejected in the service switching request message.

In an embodiment, the second response message further includes rejected reason information and/or rejected time limit information of the at least one session or service which is rejected.

In an embodiment, the service switching request message, and a first response message or a second response message are NAS messages, or the service switching request message, and the first response message or the second response message are access stratum messages.

In an embodiment, the communication unit 501 is further configured to receive instruction information from the network device before transmitting the service switching request message to the second terminal device, and the instruction information is configured to instruct that the service switching request message is determined to be transmitted to the second terminal device.

In an embodiment, the instruction information is carried in at least one message of a specific signaling, a system broadcast message, a NAS message, DCI, a MAC CE, a paging short message, and a paging message.

In an embodiment, the processing unit 502 is further configured to determine to transmit the service switching request message to the second terminal device based on capability information of the terminal device before the service switching request message is transmitted to the second terminal device, and the capability information is configured to instruct that the service switching request message is determined to be transmitted to the second terminal device.

In an embodiment, the network device is an access network device or a core network device.

As shown in FIG. 5, FIG. 5 is another structural schematic view of the terminal device involved in above embodiments. The terminal device may include the communication unit 501 and the processing unit 502. These units may perform corresponding functions of the second terminal device in method examples described above. The processing unit 502 is configured to control and manage actions of the second terminal device. The communication unit 501 may be configured to support communication between the second terminal device and other devices, e.g., the communication with the first terminal device or the network device.

The processing unit 502 may be the processor or the controller. For example, the processing unit 502 may be the Central Processing Unit (CPU), the general-purpose processor, the Digital Signal Processor (DSP), the Application-Specific Integrated Circuit (ASIC), the Field Programmable Gate Array (FPGA) or other programmable logic devices, transistor logic devices, hardware components, or any combination thereof. The processing unit 502 may implement or execute various exemplary logic blocks, modules, and circuits described in conjunction with the contents of the present disclosure. The processor may also be a combination implementing computing functions, such as the combination including one or more microprocessors, the combination of the DSP and a microprocessor, or the like. The communication unit 501 may be the transceiver, the transceiving circuit, the RF chip, etc.

The communication unit 501 is configured to receive a service switching request message from a first terminal device. The service switching request message is configured to request by the first terminal device, the terminal device to activate at least one session or service specified by the first terminal device, and the service switching request message includes identifier information of the at least one session or service.

The communication unit 501 is configured to transmit a service request message to a network device, and the service request message includes identifier information of an accepted session or an accepted service in the service switching request message.

In an embodiment, the service switching request message further includes a S-TMSI and/or a C-RNTI of the first terminal device.

In an embodiment, the service request message includes a S-TMSI and/or a C-RNTI of the first terminal device.

In an embodiment, the communication unit 501 is further configured to transmit a third request message to the first terminal device before receiving the service switching request message from the first terminal device, and the third request message is configured to instruct the first terminal device to perform a service switching process.

In an embodiment, the communication unit 501 is further configured to transmit a first response message to the first terminal device after receiving the service switching request message from the first terminal device, and the first response message is configured to indicate that the session or service identified by all the identifier information in the service switching request message is fully accepted, or the first response message is configured to indicate that the session or service identified by all the identifier information in the service switching request message is fully rejected.

In an embodiment, the communication unit 501 is further configured to transmit a second response message to the first terminal device after receiving the service switching request message from the first terminal device, and the second response message is configured to indicate that identifier information of at least one session or service which is accepted in the service switching request message, and/or the second response message is configured to indicate identifier information of at least one session or service which is rejected in the service switching request message.

In an embodiment, the second response message further includes rejected reason information and/or rejected time limit information of the at least one session or service which is rejected.

In an embodiment, the service switching request message, and a first response message or a second response message are NAS messages, or the service switching request message, and the first response message or the second response message are access stratum messages.

As shown in FIG. 6, FIG. 6 is another structural schematic view of the network device involved in above embodiments. The network device may include the communication unit 601 and the processing unit 602. These units may perform corresponding functions of the network device in method examples described above. The processing unit 602 is configured to control and manage actions of the network device. The communication unit 601 may be configured to support communication between the network device and other devices, e.g., the communication with the first terminal device or the second terminal device.

The processing unit 602 may be the processor or the controller. For example, the processing unit 602 may be the Central Processing Unit (CPU), the general-purpose processor, the Digital Signal Processor (DSP), the Application-Specific Integrated Circuit (ASIC), the Field Programmable Gate Array (FPGA) or other programmable logic devices, transistor logic devices, hardware components, or any combination thereof. The processing unit 602 may implement or execute various exemplary logic blocks, modules, and circuits described in conjunction with the contents of the present disclosure. The processor may also be a combination implementing computing functions, such as the combination including one or more microprocessors, the combination of the DSP and a microprocessor, or the like. The communication unit 601 may be the transceiver, the transceiving circuit, the RF chip, etc.

The communication unit 601 is configured to receive a service request message from a second terminal device. The service request message includes identifier information of an accepted session or an accepted service in a service switching request message, the service switching request message is transmitted by a first terminal device to the second terminal device and configured to request by the first terminal device, the second terminal device to activate at least one session or service specified by the first terminal device, and the service switching request message includes identifier information of the at least one session or service.

In an embodiment, the service request message further includes a S-TMSI and/or a C-RNTI of the first terminal device.

In an embodiment, the communication unit 601 is further configured to transmit search configuration information to the first terminal device before receiving the service request message from the second terminal device, and the search configuration information is configured to assist the first terminal device to search for the second terminal device.

In an embodiment, the search configuration information includes at least one of synchronization signal information of the second terminal device, position information of the second terminal device, and identifier information of the second terminal device.

In an embodiment, the communication unit 601 is configured to transmit a second system broadcast message or a second specific signaling to the first terminal device, and the second system broadcast message or the second specific signaling is configured to configure the search configuration information.

In an embodiment, the communication unit 601 is configured to transmit a second request message to the first terminal device before receiving the service request message from the second terminal device, and the second request message is configured to instruct the first terminal device to perform a service switching process.

In an embodiment, the communication unit 601 is configured to transmit instruction information to the first terminal device before receiving the service request message from the second terminal device, and the instruction information is configured to instruct that the service switching request message is determined to be transmitted to the second terminal device.

In an embodiment, the instruction information is carried in at least one message of a specific signaling, a system broadcast message, a NAS message, DCI, a MAC CE, a paging short message, and a paging message.

In an embodiment, the network device is an access network device or a core network device.

It can be understood that the division of the units in the embodiments of the present disclosure is schematic and is only a logical functional division, and other division manners may be allowed during actual implementations. Various functional units in the embodiments of the present disclosure may be integrated in a single processing unit, or each unit may physically exist separately, or two or more units may be integrated in a single unit. The integrated unit described above may be implemented either in a form of a hardware or in a form of a software functional unit.

The embodiments of the present disclosure also provide a computer-readable storage medium. The computer-readable storage medium is configured to store the computer program. When the computer program is run on a computer, a part of or all of operations described in the method embodiments described in relation to the first terminal device, the second terminal device, or the network device, are implemented.

The embodiments of the present disclosure also provide a computer program product. The computer program product includes the computer program or instructions. When the computer program or instructions are run on the computer, a part of or all of operations described in the method embodiments described in relation to the first terminal device, the second terminal device, or the network device, are implemented. The computer program product may be a soft installation package.

It can be appreciated that various numerals such as "first", "second", "third", and the like, are simply divisions for convenience of description, which are not intended to limit the scope of embodiments of the present disclosure.

Those skilled in the art can realize that, in one or more examples, the functions described in the embodiments of the present disclosure may be implemented in whole or in part by the software, the hardware, a firmware, or any combination thereof. When implemented by the software, the functions may be implemented in whole or in part in a form of the computer program product. The computer program product includes one or more computer instructions. When the computer program instructions are Loaded and execute on the computer, flows or functions described in accordance with the embodiments of the present disclosure are generated in whole or in part. The computer may be the general-purpose computer, a specialized computer, a computer network, or other programmable apparatuses. The computer instructions may be stored in the computer-readable storage medium or transmitted from one computer-readable storage medium to another computer-readable storage medium. For example, the computer instructions may be transmitted from a website site, a computer, a server, or a data center to another web site, another computer, another server, or another data center in a wired manner (e.g., a coaxial cable, a fiber optic, and a digital subscriber line (DSL)) or a wireless manner (e.g., infrared, wireless, microwave, etc.). The computer-readable storage medium may be any available medium storable in the computer or a data storage device such as the server, the data center, etc., integrated by one or more available media. The available medium may be a magnetic medium (e.g., a floppy disk, a hard disk, a magnetic tape), an optical medium (e.g., DVD), or a semi-conductor medium (e.g., a Solid State Disk (SSD)), etc.

What is claimed is:

1. A method of service switching between terminal devices, comprising:

transmitting, by a first terminal device, a service switching request message to a second terminal device, wherein the service switching request message is configured to request the second terminal device to activate at least one session or service specified by the first terminal device, and comprises identifier information of the at least one session or service;

wherein before the transmitting, by the first terminal device, the service switching request message to the second terminal device, the method further comprises:

receiving, by the first terminal device, search configuration information from a network device, and the search configuration information being configured to assist the first terminal device to search for the second terminal device; and establishing, by the first terminal device, a communication link between the first terminal device and the second terminal device.

2. The method according to claim 1, wherein the service switching request message further comprises a serving-temporary mobile subscriber identifier (S-TMSI) and/or a cell radio network temporary identifier (C-RNTI) of the first terminal device.

3. The method according to claim 1, further comprising:

triggering the first terminal device to transmit the service switching request message to the second terminal device in response to detecting a preset event.

4. The method according to claim 3, wherein the preset event comprises at least one of:

the first terminal device receiving a first request message from an upper layer, the upper layer being a Non-access stratum (NAS) or an application layer, and the first request message being configured to instruct the first terminal device to perform a service switching process;

the first terminal device occurring a wireless link failure;

the first terminal device occurring the wireless link failure and a rebuilding failure;

times of the first terminal device occurring the wireless link failure within a time window Tl exceeding a first threshold;

an interval between two consecutive times of the first terminal device occurring the wireless link failure being less than or equal to a second threshold;

a service-cell measurement result of the first terminal device being less than or equal to a third threshold value;

the service-cell measurement result of the first terminal device being less than or equal to a fourth threshold value and lasting for a first duration;

the first terminal device being in a state of camping on any cell or in a state of any cell selection;

a quality of service (QoS) measurement result of the first terminal device failing to satisfy a QoS requirement;

the QoS measurement result of the first terminal device failing to satisfy the QoS requirement and lasting for a second duration;

a timer T2 of the first terminal device expiring;

the first terminal device searching for at least one terminal device available to perform the service switching process;

the first terminal device receiving a second request message from the network device, and the second request message being configured to instruct the first terminal device to perform the service switching process; or the first terminal device receiving a third request message from the second terminal device, and the third request message being configured to instruct the first terminal device to perform the service switching process.

5. The method according to claim 4, wherein the preset event comprises the timer T2 of the first terminal device expiring, and the method further comprises:

turning on, by the first terminal device, the timer T2 according to a turn-on condition, and the turn-on condition comprising that the QoS measurement result of the first terminal device fails to satisfy the QoS requirement; and stopping, by the first terminal device, the timer T2 according to a stopping condition, and the stopping condition comprising that the QoS measurement result of the first terminal device satisfies the QoS requirement during operating of the timer T2.

6. The method according to claim 1, wherein the search configuration information comprises at least one of:

synchronization signal information of the second terminal device, position information of the second terminal device, or identifier information of the second terminal device.

7. The method according to claim 1, wherein after the transmitting, by the first terminal device, the service switching request message to the second terminal device, the method further comprises:

receiving, by the first terminal device, a first response message from the second terminal device, and the first response message being configured to indicate that the session or service identified by all the identifier information in the service switching request message is fully accepted, or the first response message being configured to indicate that the session or service identified by all the identifier information in the service switching request message is fully rejected.

8. The method according to claim 1, wherein after the transmitting, by the first terminal device, the service switching request message to the second terminal device, the method further comprises:

receiving, by the first terminal device, a second response message from the second terminal device, and the second response message being configured to indicate that identifier information of at least one session or service which is accepted in the service switching request message, and/or the second response message being configured to indicate identifier information of at least one session or service which is rejected in the service switching request message.

9. The method according to claim 8, wherein the second response message further comprises rejected reason information and/or rejected time limit information of the at least one session or service which is rejected.

10. The method according to claim 1, wherein before the transmitting, by the first terminal device, the service switching request message to the second terminal device, the method further comprises: receiving, by the first terminal device, instruction information from the network device, and the instruction information being configured to instruct that the service switching request message is determined to be transmitted to the second terminal device.

11. The method according to claim 1, wherein before the transmitting, by the first terminal device, the service switching request message to the second terminal device, the method further comprises: determining, by the first terminal device, to transmit the service switching request message to the second terminal device based on capability information of the first terminal device, and the capability information being configured to instruct that the service switching request message is determined to be transmitted to the second terminal device.

12. A method of service switching between terminal devices, comprising:

receiving, by a network device, a service request message from a second terminal device, wherein the service request message comprises identifier information of an accepted session or an accepted service in a service switching request message, the service switching request message is transmitted by a first terminal device to the second terminal device and configured to request by the first terminal device, the second terminal device to activate at least one session or service specified by the first terminal device, and the service switching request message comprises identifier information of the at least one session or service;

wherein before the receiving, by the network device, the service request message from the second terminal device, the method further comprises:

transmitting, by the network device, search configuration information to the first terminal device, and the search configuration information being configured to assist the first terminal device to search for the second terminal device.

13. The method according to claim 12, wherein before the receiving, by the network device, the service request message from the second terminal device, the method further comprises: transmitting, by the network device, a second request message to the first terminal device, and the second request message being configured to instruct the first terminal device to perform a service switching process.

14. A first terminal device, wherein the first terminal device comprises a processor and a memory, and the processor is configured to call and run a computer program or instructions stored in the memory to enable the first terminal device to perform:

transmitting a service switching request message to a second terminal device, wherein the service switching request message is configured to request the second terminal device to activate at least one session or service specified by the first terminal device, and comprises identifier information of the at least one session or service;

wherein before the transmitting the service switching request message to the second terminal device, the processor is configured to call and run the computer program or the instructions stored in the memory, to enable the first terminal device further to perform:

receiving search configuration information from a network device, and the search configuration information being configured to assist the first terminal device to search for the second terminal device; and establishing a communication link between the first terminal device and the second terminal device.

15. The first terminal device according to claim 14, wherein the service switching request message further comprises a serving-temporary mobile subscriber identifier (S-TMSI) and/or a cell radio network temporary identifier (C-RNTI) of the first terminal device.

16. The first terminal device according to claim 14, wherein the search configuration information comprises at least one of:

synchronization signal information of the second terminal device, position information of the second terminal device, or identifier information of the second terminal device.

17. The first terminal device according to claim 14, wherein after the transmitting the service switching request message to the second terminal device, the processor is configured to call and run the computer program or the instructions stored in the memory, to enable the first terminal device further to perform:

receiving a first response message from the second terminal device, and the first response message being configured to indicate that the session or service identified by all the identifier information in the service switching request message is fully accepted, or the first response message being configured to indicate that the session or service identified by all the identifier information in the service switching request message is fully rejected.

18. The first terminal device according to claim 14, wherein after the transmitting the service switching request message to the second terminal device, the processor is configured to call and run the computer program or the instructions stored in the memory, to enable the first terminal device further to perform:

receiving a second response message from the second terminal device, and the second response message being configured to indicate that identifier information of at least one session or service which is accepted in the service switching request message, and/or the second response message being configured to indicate identifier information of at least one session or service which is rejected in the service switching request message.

19. The first terminal device according to claim 14, wherein before the transmitting the service switching request message to the second terminal device, the processor is configured to call and run the computer program or the instructions stored in the memory, to enable the first terminal device further to perform:

receiving instruction information from the network device, and the instruction information being configured to instruct that the service switching request message is determined to be transmitted to the second terminal device.

20. The first terminal device according to claim 14, wherein before the transmitting the service switching request message to the second terminal device, the processor is configured to call and run the computer program or the instructions stored in the memory, to enable the first terminal device further to perform:

determining to transmit the service switching request message to the second terminal device based on capability information of the first terminal device, and the capability information being configured to instruct that the service switching request message is determined to be transmitted to the second terminal device.

* * * * *